Patented Dec. 27, 1938

2,141,349

UNITED STATES PATENT OFFICE 2,141,349

PROCESS FOR THE RECOVERY OF CARBON DISULPHIDE FROM INDUSTRIAL EFFLUENT WATERS

Alfred Engelhardt, Gonzenheim, near Bad Homburg vor der Hohe, Germany, assignor to Carbo-Norit-Union Verwaltungs-Gesellschaft m. b. H., Frankfort-on-the-Main, Germany, a corporation of Germany No Drawing. Application December 7, 1937, Serial No. 178,611. In Germany January 28, 1937

4 Claims. (Cl. 23—206)

This invention relates to the recovery of carbon disulphide from industrial effluent waters.

In the manufacture of rayon or cellulose wool by the viscose process effluent waters containing carbon disulphide are obtained from the spinning baths and from the washing of the spun product. The carbon disulphide content of said effluents lies between about 50 and 2,000 grms. per cubic metre, the latter figure indicating the maximum solubility of carbon disulphide in water at 20° C. In addition to carbon disulphide, said effluents generally also contain hydrogen sulphide and sulphur dioxide, and also the excess acid (for example sulphuric acid) which has not been consumed in the spinning baths. In particular, however, products of the degradation of cellulose are also contained in the effluent water.

Various practical methods have been tried for the recovery of the carbon disulphide from said effluent waters. By heating the effluent waters to approximately boiling temperature, a considerable portion of the dissolved carbon disulphide may be separated, but the consumption of heat required for this purpose is very great, and particularly expensive, acid-resisting plant is required in order to carry out this expulsion process. Moreover, the effluent waters may be washed with oils which possess a particularly high solvent power for carbon disulphide, but even when carrying out this process in counter-current flow, the accumulation of the carbon disulphide in the wash oils is not very great and the washing out effect is hardly satisfactory, because the solubility of carbon disulphide in water is still comparatively great in comparison with its solubility in the wash oils. In addition, large amounts of oil are lost in this process, as the oils— particularly basic oils—possess a marked solubility in the effluent waters. Account must also be taken of the fact that the remaining impurities in the effluent waters—for example the cellulose components resulting from degradation—contaminate the wash oils, so that the latter have to be very frequently purified by redistillation or chemical treatment.

It has been suggested in addition that the carbon disulphide should be extracted from the effluent waters by filtering the latter through substances of large superficial area, such as active carbon. It is actually possible in this way to free the effluent waters completely from carbon disulphide and to recover the adsorbent carbon disulphide by steaming out the laden active carbon. In this method of working, however, the cellulose degradation products also pass into the active carbon so that the adsorptive powers of the latter in respect of carbon disulphide very soon fall off considerably. Reactivation of the active carbon—either by chemical or by thermal means—is, however, a very expensive process. In addition, the rate of adsorption of carbon disulphide on active carbon is relatively low, so that in view of the large quantities of water to be treated very large filters would have to be employed.

It has now been ascertained in accordance with the present invention that the carbon disulphide can be extracted from the effluent waters in a substantially simpler and more economical manner than hitherto possible, by first blowing said waters with a current of air or other gases—for example the outgoing air of the spinning or washing baths—and extracting the carbon disulphide from the resulting air or other gas containing carbon disulphide, in known manner, by means of wash oils, active carbon or silica gel. In this way all contact between the wash oil or the adsorbent media and the remaining substances in the effluent waters which could contaminate or spoil the treating medium, is avoided. If the air or other gas blown out should contain acid vapours, such as hydrogen sulphide and sulphur dioxide, then these may be eliminated if necessary by washing with chemical liquids before the treating medium is allowed to act, solutions of soda lye, sodium carbonate or organic bases, in particular, being used for this purpose. In special cases—in the event of a very low content of acid constituents—it is also sufficient to carry out the washing with water, the latter preferably circulating in a continuous circuit and being aerated before the washing is carried out.

The extraction of the carbon disulphide from the wash oils or adsorbent media is carried out in known manner, and especially by steaming out. In order to avoid the formation of explosive or inflammable mixtures of air with carbon disulphide especially at elevated temperature, it is advisable, when adsorbent media are used, to displace the air contained in the adsorbers by means of inert gases, before the carbon disulphide is driven off.

Air may of course, be completely excluded when transferring the carbon disulphide from the effluent water to the wash oils or adsorbent media, by blowing out said effluent water with inert gases, such as nitrogen or producer or combustion gas, which may be used repeatedly for the same purpose after they have been stripped of their carbon disulphide content by the wash oil or the adsorbent media.

Example

In the spinning and washing baths of a cellulose wool factory 75 cubic metres of effluent water are produced hourly at a temperature of 50° C., which contain 560 grams of carbon disulphide per cubic metre, and small amounts of sulphuric acid.

Said effluent water was pumped through a spray tower 5 metres in height and 1.2 metres in diameter, which was traversed upwardly by a current of nitrogen at the rate of 360 cubic metres per hour. After passing out of the spray tower, the current of gas was cooled in a counter-current cooler and then introduced into an adsorber, filled with active carbon, of a solvent recovery plant. The current of gas passing out of the adsorber was free from carbon disulphide and was returned to the spray tower, for further loading with carbon disulphide. When the active carbon of the adsorber was saturated with carbon disulphide, it was flushed with steam in known manner and the resulting vapour mixture condensed, the condensate being separated in a separator into carbon disulphide and water.

In this manner 39 kgs. of carbon disulphide were recovered from 72 cubic metres of effluent water per hour.

Having now particularly described and ascertained the nature of my said invention and in what manner the same is to be performed, I declare that what I claim is:—

1. A process for the recovery of carbon disulphide from industrial effluent waters containing the same which comprises blowing the carbon disulphide out of said effluent waters with a gas and extracting the carbon disulphide out of the resulting gas.

2. A process as defined in claim 1 in which the gas is air.

3. A process as defined in claim 1 in which the gas is contacted with the effluent water in counter current flow.

4. A process for the recovery of carbon disulphide from the effluent waters produced in the manufacture of rayon by the viscose process which comprises blowing the carbon disulphide out of the water with the outgoing air of the spinning and washing baths and extracting the carbon disulphide from the resulting mixture thereof with said air.

ALFRED ENGELHARDT.